United States Patent [19]

Scholten et al.

[11] 4,228,260

[45] Oct. 14, 1980

[54] SUPPORTED CHROMIUM-OXIDE POLYMERIZATION CATALYST HAVING A POROUS SILICA SUPPORT USED IN THE POLYMERIZATION OF OLEFINES

[75] Inventors: Joseph J. F. Scholten, Sittard; Lambertus J. M. A. van de Leemput, Echt, both of Netherlands

[73] Assignee: Stamicarbon, B.V., Geleen, Netherlands

[21] Appl. No.: 32,223

[22] Filed: Apr. 23, 1979

Related U.S. Application Data

[62] Division of Ser. No. 924,746, Jul. 14, 1978.

[30] Foreign Application Priority Data

Jul. 18, 1977 [NL] Netherlands .......................... 7707961

[51] Int. Cl.$^2$ ............................. C08F 4/02; C08F 4/24
[52] U.S. Cl. ..................................... 526/106; 252/451; 252/458; 423/335; 423/336; 423/337; 423/338; 526/352; 526/906; 526/908
[58] Field of Search ......................................... 526/106

[56] References Cited

U.S. PATENT DOCUMENTS

| | | | |
|---|---|---|---|
| 3,132,125 | 5/1964 | Schwander et al. | 526/909 |
| 3,239,498 | 3/1966 | Witt | 526/907 |
| 3,243,262 | 3/1966 | Carr | 526/106 |
| 3,819,598 | 6/1974 | Galiano et al. | 526/62 |

*Primary Examiner*—Stanford M. Levin
*Attorney, Agent, or Firm*—Cushman, Darby & Cushman

[57] ABSTRACT

Process for the preparation of a porous, pure silica which is particularly suitable as a catalyst support for a chromium-oxide catalyst used in polymerizing of olefins. The process comprises the steps of converting a silicon-halogen compound to a silica and then admixing with water to form a silica gel. The gel is then spray-dried to achieve the required particle size and pore volume.

The silica can then be made into a catalyst by placing on the support a chromium compound and then heating in a non-reducing atmosphere.

2 Claims, No Drawings

SUPPORTED CHROMIUM-OXIDE POLYMERIZATION CATALYST HAVING A POROUS SILICA SUPPORT USED IN THE POLYMERIZATION OF OLEFINS

This is a division of application Ser. No. 924,746 filed July 14, 1978.

This invention relates to a process for preparing a porous, pure silica that is particularly suitable as a catalyst support, and to a process for preparing catalysts comprised of the steps of depositing a chromium compound on such a silica and then heating the combination in a non-reducing atmosphere.

BACKGROUND OF THE INVENTION

The preparation of silica is usually done by either of two methods. According to one method, silica is prepared by converting a silica-hydrogel precipitate, that is then washed and dried. Products prepared in accordance with a method of this type are usually called silica gels and are mainly used as adsorbents and as catalyst supports. In order to be able to meet some of the various criteria for catalyst supports, a great many different embodiments of this type of process have been proposed and described, e.g., in Netherlands Patent Applications Nos. 69.11999 and 69.12002, German Patent Application 2,411,735, Canadian Patent Specification No. 967,936, and U.S. Pat. Nos. 2,700,061; 2,731,326; 2,763,533; 2,765,242; 2,785,051; 3,428,425; 3,433,593 and 3,453,077.

For some other uses, such as fillers, reinforcing agents, thickeners, and the like, silica is prepared by flame hydrolysis of silicon-halogen compounds, i.e., conversion of these compounds with a combustible hydrogen-containing gas.

The particle size of silica prepared by flame hydrolysis is considerably smaller than that of the silica gels. A silica prepared by flame hydrolysis consists of primary particles ranging from a few millimicrons to at most a few dozens millimicrons. These primary particles usually agglomerate into bigger, so-called secondary particles, the particle size of which usually range from about 1 to about 10 microns.

The particle size of the silica gels can readily be controlled, and these gels can also be prepared in the form of granules or small lumps.

According to a well-known method for preparing polyolefins, notably polythene, an α-olefin, e.g., ethene, is polymerized with the aid of catalysts based on chromium dioxide on a support such as, silica. Catalysts of this type are prepared by impregnating the support with a solution of chromium oxide, a compound that can be converted into chromium oxide, or a composition containing chromium oxide, drying the impregnated support and activating the catalyst composition by heating it at temperatures between about 400° C. and about 1000° C. in a non-reducing atmosphere such as, an inert atmosphere like nitrogen or carbon monoxide, or in an oxidizing atmosphere preferably air. Catalysts of this type are sometimes referred to as Phillips-type catalysts. These supported chromium-oxide catalysts may be used as such, but organometallic compounds may also be added.

The most practical method of activating the catalyst composition is by heating in a fluidized bed. Such a method, however, can be used only if the silica support has a given minimum particle size, as otherwise a considerable part of the supported catalyst will be blown out of the fluidized bed causing major dust problems. For this reason, silica prepared by flame hydrolysis which has a small particle size is not desirable as a catalyst support. In order to be able to heat the supported catalyst in a fluidized bed at temperatures between about 400° and about 1000° C., the particles must have not only a minimum particle size, but also must have sufficient strength to withstand the strong abrasive forces in the fluidized bed reactor. Otherwise, strong abrasion and pulverization will occur in the fluidized bed forming large fractions of fine particles which cause dust problems and which are not suitable as particles of supported catalyst.

It has also been discovered that the support must meet certain other requirements in order to produce a catalyst which obtains high yields of polyolefins with good product properties. One of these requirements is that the silica support must have a given porosity, which must be retained as much as possible when the support is heated. In this regard, the content of impurities, notably the sodium content, was discovered to be of critical importance. When this content is high, the pore volume decreases when the silica is heated, in some cases the pore volume has decreased to very low values of no more than a few tenths of $cm^3/g$. This decrease in pore volume has an unfavorable effect on the activity of the catalyst. Even if the pore volume decrease is comparatively small, if there is too high of a sodium content, the activity of chromium oxide and similar catalysts will still be low. The cause of this decrease in activity of the catalyst is not yet clear. One suggestion in that crystallization phenomena play a part, but this is still an open question.

A drawback of many Phillips-type catalysts is that the melt index of the polyethylene to be produced can be controlled effectively only by means of the polymerization reactor temperature. Because the sensitivity of these catalysts to hydrogen as a molecularweight regulator is slight, large amounts of hydrogen are generally used to regulate the molecular weight.

For producing polyethylene with comparatively high melt indices, the solution process is suitable, i.e., polymerization is effected at temperatures of at least about 110° C. and a solution of polyethylene in the solvent used, e.g., gasoline, is obtained. The problem with the solution process is that it is more expensive than the suspension process. This is because the polymerization in the suspension process is effected at a lower temperature, generally about 65° C. to about 85° C.

Phillips-type catalysts, and notably supports for these catalysts now exist for the preparation of polyethylene with comparatively high melt indices by polymerization in a suspension process. However, the preparation of supports for catalysts of this type has been cumbersome and time-consuming. Sodium-silicate solution is used as a starting material and silica is made of precipitate from it by means of an acid, usually sulphuric acid. The supports must be thoroughly free of sodium, therefore, washing for prolonged periods is required to obtain the desired low sodium concentrations. As a result of this cumbersome process, the cost of making these supports has been high. Up until now, other suggestions for supports or catalysts for the preparation of polyethylene with comparatively high melt indices of polyethylene with comparatively high melt indices in a suspension process have so far given few, if any, results.

It has now been discovered that chromium-oxide catalysts on a silica support prepared according to the present invention are highly sensitive to hydrogen and that they allow the preparation of a polyethylene of any desired melt index by the suspension process.

The catalyst on support, and hence the support, must have a given minimum particle size, because in addition to reasons discussed above, the particle size of the support also affects the particle size of the polymer. During transport, trans-shipment and processing, a fine polymer with small particle sizes causes dust problems that become more serious as the particle sizes of the polymer become smaller. Therefore, the support must have an average particle size of at least about $10\mu$, preferably, at least about $40\mu$, and even more preferably, at least about $80\mu$.

The powder properties of the polymer are such that it is desirable that the particle-size distribution of the polymer be in a narrow range, i.e., the particle size distribution factor according to Rosin-Rammler must be at least 2. In addition to the dust problem discussed above, the particle size distribution also affect the flowing and handling properties of the material, i.e., the ability of being able to move the material from container to container during shipment and further processing. In order to obtain polymer powders of this type, the particle size distribution factor of the support must also be at least 2. The determination of the average particle size and particle-size distribution can be done by a screen analysis. The results of the screen analysis can then be plotted in a double logarithmic-logarithmic Rosin-Rammler diagram. The point on the curve corresponding to a screen residue of 36.8% indicates the average particle size. The gradient of the curve is a measure of the width of the particle-size distribution. The steeper the gradient, the greater the uniformity factor and the narrower the particle-size distribution. Particles which are too coarse are also not too desirable. The average particle size is preferably at most about $250\mu$, and, even more preferable, at most about $200\mu$, at a particle size distribution factor of at least 2 and, preferably at least 3.

OBJECTS OF THE INVENTION

While silica gels prepared by precipitation from sodium silicate can generally be made to meet the demands of particle size and particle size distribution, a sufficiently low sodium content can only be achieved by cumbersome and time-consuming methods.

Therefore, it is an object of the present invention to provide an economic process by which a silica with all the aforementioned advantages as a catalyst support can be prepared.

In particular, the process of the present invention will produce a silica that is suitable as a support for catalysts of the chromium-oxide type for the polymerization of olefins, especially ethylene. Another object of the invention is to provide catalysts of the chromium-oxide on silica type, by means of which polyolefins, in particular polyethylene, with excellent processing properties can be obtained at high yields.

DESCRIPTION OF THE INVENTION

The objects of the present invention can be achieved by preparing a silica with (1) an average particle size of at least about $10\mu$, preferably at least about $40\mu$, and even more preferably, at least about $80\mu$, (2) a pore volume of at least about 1.0 cm$^3$/g, preferably at least about 1.5 cm$^3$/g, and even more preferably, at least about 1.8 cm$^3$/g, and (3) a sodium content of at most about 200 ppm (parts by weight per million), preferably at most about 150 ppm.

It has now been discovered that a silica with an average particle size of at least about $10\mu$, a pore volume of at least about 1.0 cm$^3$/g, and a sodium content of at most about 200 ppm can be prepared by taking a silica obtained by converting a silicon-halogen compound with a combustible hydrogen-containing gas admixing at least an equal amount of water to form a gel, and spray-drying this gel in such a way that particles with an average particle size of at least about $10\mu$ and a pore volume of at least about 1.0 cm$^3$/g are formed.

The spray-drying conditions are preferably chosen so that the particle size is at least about $40\mu$, and even more preferably, at least $80\mu$. On the other hand, too coarse particles are also not desirable, and, hence, such spray-drying conditions are chosen that the average particle size is preferably at most $250\mu$, and, even more preferably, at most $200\mu$. The particle size distribution factor is at least 2 and, preferably, at least 3.

The spray-drying of many different materials is commonly known with a number of different spray-driers having been developed for these purposes. A survey of these devices is given by K. Kroll in "Trocknungstechnik", Volume 2, "Trockner und Trocknungsverfahren", Springer-Verlag 1959, pp. 303–324. The average diameter of the droplets atomized in a spray-drier is a function of the surface tension, the density, the viscosity, and of the outflow rate and outflow angle from the atomizer. Adjustment of these variables makes it possible to produce a product with a given predetermined particle size. Also known in the spray-drying art are which conditions must be chosen in order to prepare particles with a narrow particle size distribution. For the purposes of the present invention these conditions are preferably chosen so that a silica gel is produced which has a particle size distribution factor of at least 2 and, preferably, a particle size distribution factor of at least 3.

The porosity and, hence, the pore volume are affected by, inter alia, the amount of liquid phase. A silica gel that is to be spray-dried must contain enough water to obtain the desired porosity.

The spray-drying of the gel may be done in the known equipment with the gel atomized through the spray-drying nozzle. Spray-drying installations must be supplied with heated air, and in the process of the present invention the temperature of the drying air is usually not higher than about 400° C. Higher temperatures may be used, but are not generally used for both economic and technical reasons. The temperature of the drying air is preferably at most about 250° C. Of course, spray-drying may also be carried out in other atmospheres, but the economic drawbacks of using large amounts of, e.g., nitrogen, carbon monoxide, carbon dioxide, or oxygen render these atmospheres unattractive.

While a silica prepared by flame hydrolysis has a very low sodium content, it has, however, the disadvantages as mentioned above, of small particle size and a poor particle size distribution. The process of the present invention makes it possible to prepare a considerably coarser silica while retaining the extremely low sodium content of a silica prepared by flame hydrolysis.

Although the preparation of silica gels is usually cheaper than the preparation of silica by flame hydrolysis of silicon-halogen compounds, this is not true when preparing silica gels with very low sodium contents. Hence, the present invention not only offers the advantage that high-grade supports for catalysts of the chromium type for the polymerization of olefins can be prepared, but it is also attractive economically. Of course, the use of these silica gels is not restricted to supports for catalysts of the chromium-oxide type.

Silica prepared by flame hydrolysis may be converted to a gel with water in various ways. The silica may be admixed or ground with water. Then the mixture is preferably allowed to stand for some time, generally at least for several hours. Considerably longer aging periods of from several days to several months may also be employed with favorable effects on the formation of the gel. The admixing or grinding may be carried out at both ambient temperatures and at elevated temperatures of up to about 100° C., and also under pressure at higher temperatures of up to, e.g., about 300° C. Supercritical conditions may also be used.

The amount of water admixed is at least 50% by weight calculated to silica plus water, and is preferably large enough so that the gel can readily be spray-dried. Concentrations of from about 10% to about 25% by weight of silica calculated to the total amount of mixture are very suitable, i.e., a triple to tenfold weight of water relative to the silica may be used. Of course, larger amounts of water may be used to form a gel, but these quantities are uneconomical when spray-drying.

Also, agglomeration agents, such as ammonia, sodium hydroxide or other bases, may be added to the gel. If sodium hydroxide is used, the amounts of sodium hydroxide must be chosen so that the sodium content of the support increases by less than about 100 ppm. When heated, the silica gels appear to be more sensitive to sodium which has been added than to sodium which was already present. Therefore, ammonia is preferably used as the agglomeration agent.

The mechanical strength of the silica-gel particles obtained from the spray-drying is important in the preparation of chromium-oxide catalysts. As discussed above, this type of catalyst is prepared by impregnating the silica support with a chromium compound and then heating this impregnated support to temperatures between about 400° C. and about 1000° C. in a non-reducing atmosphere. The most practical method of accomplishing this heating is to do so in a fluidized bed. However, when the silica-gel particles have insufficient mechanical strength, strong abrasion and pulverization will then occur with an attendant increase in the number of fine particles. These fine particles will be blown out of the fluidized bed and the losses of supported catalyst will be high.

The use of an agglomeration agent in the preparation of the gel gives coarse, mechanically stronger granules which, when heated in a fluidizing bed, do not or only slightly wear down or pulverize.

In accordance with the present invention, a silica gel can be impregnated with a chromium compound by adding a solution of the chromium compound to the silica gel and removing the solvent by either filtration or evaporation. In most instances, solutions of a chromium compound in water are used, but solutions in organic solvents can be profitably used with appropriate chromium compounds. Mixing in the solid state is also possible.

The silica gel impregnated with a chromium compound is then heated at temperatures between about 400° C. and about 1000° C. in a non-reducing atmosphere, preferably an oxygen-containing atmosphere such as air in order to activate the supported catalyst. A great variety of these catalysts exist. The activation temperatures are often about 900° C. and, hence, a suitable support must be able to stand such temperatures without damage. Of critical importance is the pore volume which must not or only slightly changed upon heating to about 900° C. The supports prepared in accordance with the present invention meet these demands.

The application or impregnation of the chromium compound to the support along with the subsequent heating is well known in the art and will not be further explained.

The present process of preparing suitable supports for such catalysts is particularly economically advantageous. The starting material is silica free of or poor in sodium, and is prepared by flame hydrolysis. Therefore, no cumbersome and expensive washing treatment is necessary. The use of the present silica gels in the preparation of supported chromium-oxide catalysts permits the production of catalysts that are well suited to prepare polyolefins, especially polyethylene, with widely varying melt indices by a suspension-polymerization process.

The invention will be elucidated further by the following Examples.

EXAMPLES

Example 1

100 Grams of Aerosil 130 V was admixed vigorously with 900 grams of water for 1 hour. Then the gel was allowed to stand for five days. Aerosil 130 V is put on the market by Degussa and is a silica prepared by flame hydrolysis and having a specific area of 130 m$^2$/g and an average size of the secondary particles of 6$\mu$. The 10% gel of Aerosil 130 V was then spray-dired in a centrifugal spray-drier at 32,500 revolutions per minute, a feed of 1.5 liters of gel per hour, an inlet temperature of 170° C. and an outlet temperature of 85° C. The silica obtained had an average particle size of 17$\mu$, a particle size distribution factor n=2.1, a sodium content of less than 5 ppm, and a pore volume of 2.67 cm$^3$/g. After 6 hours heating at 900° C., the pore volume was 3.0 cm$^3$/g.

Example 2

100 Grams of Aerosil 130 V were admixed with 900 grams of water and then so much ammonia was added with stirring that the pH was equal to 9.5. The mixture was then stirred vigorously for 1 hour, after which the gel was allowed to stand for five days. The gel was then spray-dried in the way described in Example 1. The silica obtained had an average particle size of 40$\mu$, i.e., twice the size of Example 1, where no agglomeration agent was added. The particle size distribution factor n=2.2, the sodium content was again lower than 5 ppm, the pore volume was 2.06 cm$^3$/g, and after 6 hours calcination at 900° C. it was 2.3 cm$^3$/g.

Comparative Example A

Ketjen F-5—a silica gel put on the market by Ketjen and having a particle size of 55$\mu$, a particle size distribution factor n=3.5, a sodium content of 220 ppm and a pore volume of 1.26 cm$^3$/g—was heated at 900° C. for 6 hours. The pore volume was found to have dropped to 0.16 cm$^3$/g.

Example 3

2.835 Grams of chromium (III) acetyl acetonate were suspended in 500 ml of light gasoline (Boiling range 65-85° C.) with stirring and then 6.14 ml of triisobutyl aluminum were added and the suspension was boiled with reflux cooling until a solution had formed. 37.7 ml of this solution were added to 9.4 grams of the silica gel prepared according to Example 2, which was heated under nitrogen for 4 hours and was suspended in 100 ml of light gasoline. The gasoline was removed by evaporation and the silica gel, on which the complex chromium compound had deposited, was heated at 900° C. in a flow of dry air for 8 hours, after which it was allowed to cool slowly to room temperature. The powder contained 0.33% by weight of chromium.

7.5 Grams of this catalyst were suspended in 200 ml of light gasoline. 5 ml of this suspension were put in a stirred autoclave together with 1500 ml of light gasoline, so that the concentration was 0.008 mmole of chromium per liter. 0.3 ml of 1 M triisobutyl aluminum in gasoline was added (concentration 0.2 mmole/l), the reactor was closed and ethene was fed in. The polymerization was continued for 1.5 hours at 85° C. and under a total pressure of 7 atm. The yield was 87 grams of polythene, the activity of the catalyst being 920 grams of polythene per mmole of chromium per atmosphere of ethene pressure and per hour. The average particle size determined by sieve analysis was 490μ, the particle size distribution factor n=2.6.

Comparative Example B

The process of Example 3 was repeated with Aerosil 130 being used as the support. The activity of the catalyst was 950 g of polythene per mmole of chromium per atmosphere of ethene pressure and per hour, but the average particle size was only 240μ and the particle size distribution factor n was only 1.4.

Example 4

15 kg of Aerosil 130 V, 85 liters of water and 0.6% by weight of ammonia calculated to the Aerosil were admixed together. The pH of the suspension was 9.5. The suspension was stirred for 10 minutes with an Ultra-Turax stirrer, a very fast commercially available stirrer.

The 15% gel thus obtained was spray-dried in a spray-drier (made by Industriewerke Karlsruhe) having an evaporating capacity of 6 to 10 kg of water and provided with a Lechner spray nozzle. The drying air was heated to 170° C.

The yield was about 2.5 kg of silica-gel per hour.

The average particle size of the silica gel was 90μ, the pore volume was 1.85 cm$^3$/g and the sodium content was less than 5 ppm.

What is claimed is:

1. In a process for polymerizing olefines, the improvement consisting of using as the polymerization catalyst, a supported chromium-oxide catalyst having as the support a porous, pure silica with a sodium content of at most about 200 ppm and a pore volume of at least about 1.0 cm$^3$/g prepared by the process comprising the steps of
   (a) admixing to a non-porous silica prepared by the flame hydrolysis of a silica-halogen compound at least about 50% by weight of water per weight of water plus silica,
   (b) forming a silica gel from said admixture of non-porous silica and water,
   (c) spray drying said silica gel to form a catalyst support,
   (d) placing a chromium compound on said support, and
   (e) heating the supported chromium compound in a non-reducing atmosphere to form a supported chromium compound.

2. Process of claim 1, wherein the olefin being polymerized is ethylene.

* * * * *